(12) United States Patent
Yen et al.

(10) Patent No.: US 8,064,694 B2
(45) Date of Patent: Nov. 22, 2011

(54) NONHUMAN ANIMAL INTEGUMENT PIXEL CLASSIFICATION

(75) Inventors: Jonathan Yen, San Jose, CA (US);
Debargha Mukherjee, Palo Alto, CA (US); Daniel Tretter, Palo Alto, CA (US); Suk Hwan Lim, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1471 days.

(21) Appl. No.: 11/472,712

(22) Filed: Jun. 21, 2006

(65) Prior Publication Data

US 2007/0297673 A1    Dec. 27, 2007

(51) Int. Cl.
*G06K 9/34* (2006.01)

(52) U.S. Cl. ......................... 382/173; 382/162

(58) Field of Classification Search .................. None
See application file for complete search history.

(56) References Cited

U.S. PATENT DOCUMENTS

| | | | |
|---|---|---|---|
| 5,432,863 A | 7/1995 | Benati et al. | |
| 6,009,209 A | 12/1999 | Acker et al. | |
| 6,016,354 A | 1/2000 | Lin et al. | |
| 6,292,574 B1 | 9/2001 | Schildkraut et al. | |
| 6,307,964 B1 | 10/2001 | Lin et al. | |
| 6,529,630 B1 * | 3/2003 | Kinjo ............................ | 382/190 |
| 6,728,401 B1 | 4/2004 | Hardeberg | |
| 6,766,053 B2 | 7/2004 | Fan et al. | |
| 6,873,743 B2 | 3/2005 | Steinberg | |
| 6,917,703 B1 | 7/2005 | Steffens et al. | |
| 7,023,447 B2 * | 4/2006 | Luo et al. ...................... | 345/582 |
| 7,162,095 B2 * | 1/2007 | Chen et al. .................... | 382/240 |
| 2001/0046311 A1 * | 11/2001 | Okano et al. .................. | 382/115 |
| 2002/0136450 A1 | 9/2002 | Chen et al. | |
| 2002/0176623 A1 | 11/2002 | Steinberg | |
| 2003/0007687 A1 | 1/2003 | Nesterov et al. | |
| 2003/0044042 A1 | 3/2003 | King et al. | |
| 2003/0202105 A1 | 10/2003 | Gaubatz et al. | |
| 2004/0184670 A1 | 9/2004 | Jarman et al. | |
| 2004/0213476 A1 | 10/2004 | Luo et al. | |
| 2005/0047655 A1 | 3/2005 | Luo et al. | |
| 2005/0047656 A1 | 3/2005 | Luo et al. | |
| 2005/0175227 A1 | 8/2005 | Paschalakis | |

FOREIGN PATENT DOCUMENTS

WO    WO99/17254    4/1999

OTHER PUBLICATIONS

Gaubatz. M. et al., "Automatic red-eye detection and correction," 2002 International Conference on Image Processing, vol. 1, pp. 804-807 (2002).

(Continued)

*Primary Examiner* — Daniel Mariam
*Assistant Examiner* — Elisa Rice

(57) ABSTRACT

Systems and methods of classifying pixels into a nonhuman animal integument class are described. In one aspect, values of features in a discriminant space are determined for respective pixels of the input image. The pixels are classified into a nonhuman animal integument class based on the respective feature values and a mapping that segments the discriminant space into one or more regions of feature values representing pixels associated with a nonhuman animal integument characteristic and one or more regions of feature values representing pixels unassociated with the nonhuman animal integument characteristic.

20 Claims, 6 Drawing Sheets

OTHER PUBLICATIONS

R-L Hsu, M. Abdel-Mottaleb and A.K. Jain, "Face Detection in Color Images," ICIP, Thessaloniki, 2001.

"Better Pictures, More Choices," Eastman Kodak Company, (Feb. 5, 2002).

"Industry's first completely automatic red eye detection and reduction system launched," Pictos Technologies, Inc. (Apr. 2002).

"Red-Eye Removal," Pixology—Product Categories, (before Apr. 2003).

Paul Viola and Michael J. Jones, "Robust Real-Time Object Detection," Cambridge Research Reports Technical Report Series (Feb. 2001).

Chrisophe Garcia & Georgios Tziritas, "Face Detection Using Quantized Skin Color Regions Merging and Wavelet Packet Analysis," IEEE Transactions on Multimedia, vol. 1, No. 3 S.

R. Ulichney. M. Gaubatz, JM Van Thong, "RedBot—a tool for improving red-eye correction", Eleventh Color Imaging Conf., (The Society for Imaging Science and Technology), Scot.

Jonathan Yen et al., "Redeye selection in semiautomatic mode," Research Disclosure, p. 546, May 2005.

Minh N. Do et al., "The contourlet transform: an efficient directional multiresolution image representation," IEEE Trans Image Proc., vol. 14. No. 12 (Dec. 2005).

Duncan D.-Y. Po et al., "Directional Multiscale Modeling of Images using the Contourlet Transform," IEEE Trans Image Proc., vol. 15, No. 6 (Jun. 2006).

A.C. Bovik et al., "Multichannel texture analysis using localized spatial filters," IEEE Trans Pattern Analysis & Mach. Intell., vol. 12, No. 1, pp. 55-73 (Jan. 1990).

Ramin Eslami et al., "On low bit-rate coding using the contourlet transform," Asilomar Conference on Signals, Systems, and Computers, Pacific Grove, USA, Nov. 2003.

Jia Li et al., "Context-based multiscale classification of document images using wavelet coefficient distributions," IEEE Trans Image Proc., vol. 9, No. 9,1604-16(Sep. 2000).

Kenny Teng et al., "Face recognition using wavelet representations obtained from different pruning strategies," Dept. of ECE Carnegie Mellon University (Dec. 2005).

John R. Smith et al., "Transform features for texture classification and discrimination in large image databases," Proc. IEEE Int'l Conf on Image Proc (ICIP-94) (1994).

Nasir Rajpoot, "Texture classification using discriminant wavelet packet subbands," MWSCAS'2002, Tulsa, Oklahoma (USA) (Aug. 2002).

Nicu Sebe et al., "Wavlet based texture classification," International Conference on Pattern Recognition (ICPR'00), vol. III, pp. 959-962 (2000).

* cited by examiner

NONHUMAN ANIMAL INTEGUMENT PIXEL CLASSIFICATION

CROSS-REFERENCE TO RELATED APPLICATIONS

This application relates to co-pending U.S. patent application Ser. No. 11/260,636, filed Oct. 27, 2005, by Jonathan Yen et al. and entitled "Detecting and Correcting Peteye," which is incorporated herein by reference

BACKGROUND

Systems for automatically classifying images may be used in a wide variety of applications, including computer vision systems and media asset organization and retrieval systems. Many automatic classification systems classify images based at least in part on a content-based analysis of the images. In these systems, an image or a region of an image typically is represented by a set of low-level features (e.g., texture, color, and shape) that are extracted from the image. The images or image regions are classified by applying the corresponding features into a classifier, such as a Support Vector Machine, which has been trained on pre-labeled images or image regions in a target class (e.g., a human face class or a scene type class). Based on the input features, the classifier determines whether or not new image instances should be classified into the target type class.

In some content-based image retrieval approaches, low level visual features are used to group images into meaningful categories that, in turn, are used to generate indices for a database containing the images. In accordance with these approaches, images are represented by low level features, such as color, texture, shape, and layout. The features of a query image may be used to retrieve images in the databases that have similar features. In general, the results of automatic categorization and indexing of images improve when the features that are used to categorize and index the image more accurately capture the target aspects of the content of the images.

As individuals and organizations continue to rapidly accumulate large collections of image content, they increasingly will require systems and methods for organizing and browsing the image content in their collections. Although efforts have been made to detect and classify aspects (e.g., faces and eyes) of human subjects, little effort has been made to detect and classify aspects of nonhuman animals, such as dogs, cats, birds, and reptiles, which constitute a significant fraction of the image content that is captured and maintained in image databases. Accordingly, what are needed are systems and methods that are designed specifically to automatically classify pixels of nonhuman animals in images.

SUMMARY

The invention features methods, systems, and machine-readable media for processing an input image.

In one aspect of the invention, values of features in a discriminant space are determined for respective pixels of the input image. The pixels are classified into a nonhuman animal integument class based on the respective feature values and a mapping that segments the discriminant space into one or more regions of feature values representing pixels that are associated with a nonhuman animal integument characteristic and one or more regions of feature values representing pixels that are not associated with the nonhuman animal integument characteristic.

Other features and advantages of the invention will become apparent from the following description, including the drawings and the claims.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

I. INTRODUCTION

The embodiments that are described in detail below provide systems and methods that are capable of classifying pixels of nonhuman animals in an image based on the values of features that are determined for the pixels of the image. The features are designed to capture one or more characteristics of image content depicting nonhuman animal integument (i.e., the outer protective covering, such as fur, hair, or skin, of a nonhuman animal). The embodiments specifically are designed to segment feature values representing pixels that are associated with a nonhuman animal integument characteristic (e.g., the color or texture of fur, hair, or skin of a nonhuman animal) from feature values representing pixels that are not associated with the nonhuman animal integument characteristic. Consequently, these embodiments are expected to more accurately detect image content corresponding to nonhuman animal integument and thereby provide improved automatic categorization and indexing of images of nonhuman animals.

II. OVERVIEW

Figure 1:
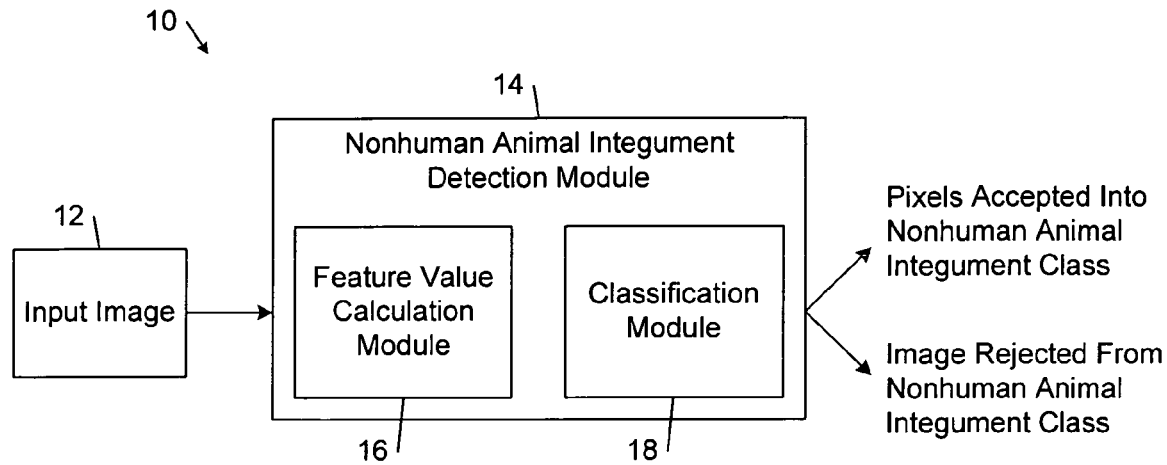
FIG. 1 is a block diagram of an embodiment of an image processing system.

FIG. 1 shows an embodiment of a system 10 for processing an input image 12. The input image 12 may correspond to any type of image, including an original image that was captured by an image sensor (e.g., a video camera, a still image, or an optical scanner) or a processed (e.g., sub-sampled, filtered, reformatted, enhanced or otherwise modified) version of such an original image. The image processing system 10 includes a nonhuman animal integument detection module 14 that classifies pixels of an input image 12 that are likely to contain nonhuman animal integument pixels into a nonhuman integument class. As used herein, the term "nonhuman animal integument" refers to the outer protective covering, such as fur, hair, or skin, of a nonhuman animal (e.g., a dog, a cat, a bird, and a reptile).

In the illustrated embodiment, the nonhuman animal integument detection module 14 includes a feature value calculation module 16 and a classification module 18. As explained in detail below, the feature value calculation module 16 calculates values of features for respective pixels of the input image 14. The features are designed to capture one or more characteristics of image content depicting nonhuman animal integument. The features define (or span) a discriminant space. The classification module 16 incorporates a mapping that segments the discriminant space into one or more regions (or clusters) of feature values representing pixels that are associated with a nonhuman animal integument characteristic and one or more regions of feature values representing pixels that are not associated with the nonhuman animal integument characteristic. The classification module 16 determines whether to accept pixels of the input image 14 into the specified nonhuman animal integument class or to reject pixels of the image 14 from the specified nonhuman animal integument class based on the mapping and the respective feature values that were calculated for the pixels.

The image processing system 10 may be used in a wide variety of applications, including computer vision systems and media asset organization and retrieval systems. In general, the image processing system 10 (including the feature value calculation module 16 and the classification module 18) is not limited to any particular hardware or software configuration, but rather it may be implemented in any computing or processing environment, including in digital electronic circuitry or in computer hardware, firmware, device driver, or software. For example, in some implementations, the image processing system 10 may be embedded in the hardware of any one of a wide variety of electronic devices, including desktop and workstation computers, digital still image cameras, digital video cameras, printers, scanners, and portable electronic devices (e.g., mobile phones, laptop and notebook computers, and personal digital assistants).

In some implementations, computer process instructions for implementing the image processing system 10 and the data it generates are stored in one or more machine-readable media. Storage devices suitable for tangibly embodying these instructions and data include all forms of non-volatile memory, including, for example, semiconductor memory devices, such as EPROM, EEPROM, and flash memory devices, magnetic disks such as internal hard disks and removable hard disks, magneto-optical disks, and CD-ROM.

Figure 2:
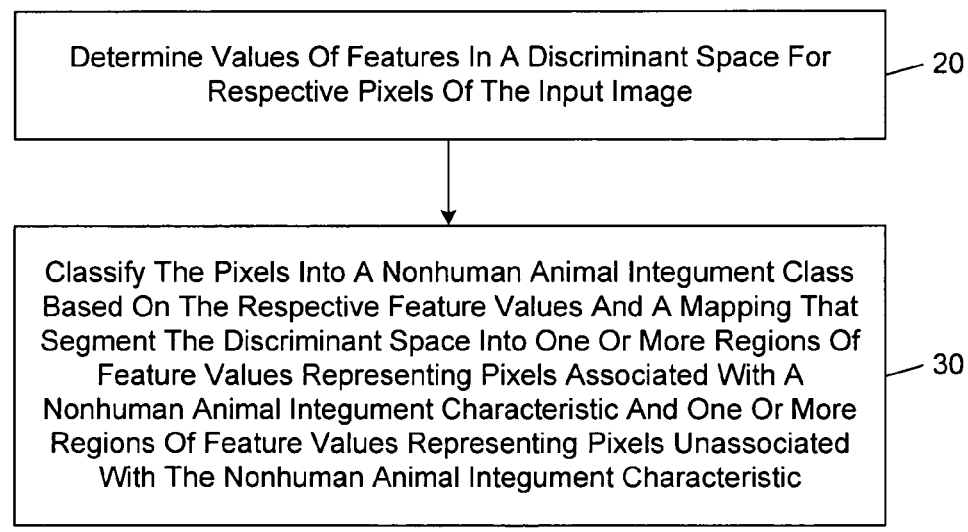
FIG. 2 is a flow diagram of an embodiment of a method of processing an image.

FIG. 2 shows a flow diagram of an embodiment of a method in accordance with which the image processing system 10 classifies pixels of the input image 12 into the target nonhuman animal integument class.

In accordance with this method, the feature value calculation module 16 determines values of features in a discriminant space for respective pixels of the input image (FIG. 2, block 20). In general, the feature value calculation module 16 calculates values of one or more features for respective pixels of the input image. The features are designed to capture one or more characteristics (e.g., color or texture) of image content depicting at least one nonhuman animal integument.

The classification module 18 classifies the pixels of the input image 12 into a nonhuman animal integument class based on the respective feature values that were calculated by the feature value calculation module 16 and a mapping that segments the discriminant space (FIG. 2, block 30). The mapping segments the discriminant space into one or more regions (or clusters) of feature values representing pixels that are associated with the at least one nonhuman animal integument characteristic and one or more regions of feature values representing pixels that are not associated with the at least one nonhuman animal integument characteristic.

Figure 3:
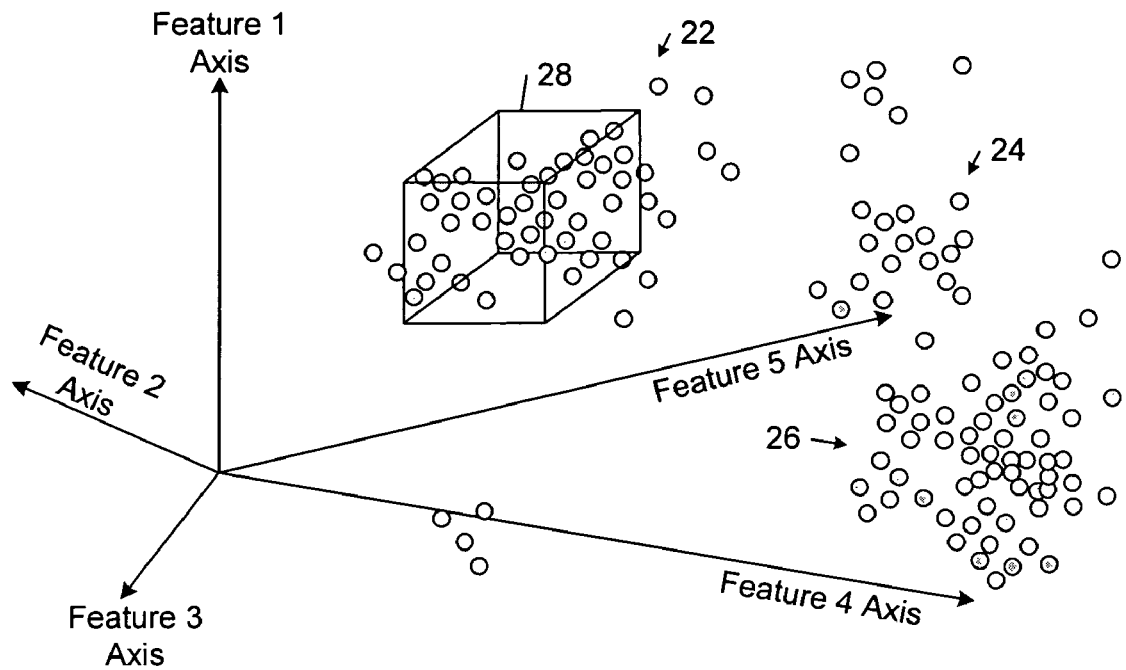
FIG. 3 is a diagrammatic view of a devised population of pixels mapped into a discriminant space that is spanned by a set of features.

FIG. 3 shows an exemplary mapping of pixels (represented by circles) of the input image 12 into a devised discriminant space that is defined along five axes (or dimensions) corresponding to five different types of features (i.e., Feature 1, Feature 2, . . . , Feature 5). In this derived mapping, the pixels form three clusters 22, 24, 26 in the devised discriminant space. These clusters may be identified using standard data mining techniques (e.g., k nearest neighbor (k-NN) clustering, hierarchical agglomerative clustering, and k-means clustering). In some implementations, relational data mining techniques, such as learning of relational decision trees, relational classification and association rules, and distance based approaches to relational learning and clustering, are used to identify one or more mappings corresponding to the boundaries of regions (e.g., the rectangular box-shaped region 28) that respectively encompass the identified pixel clusters 22-26. The identified boundaries are translated into one or more feature predicates, which can be used by the classification module 18 to classify pixels into one or more nonhuman animal integument classes.

III. COLOR DISCRIMINANT SPACES FOR CLASSIFYING PIXELS OF THE INPUT IMAGE

Certain color discriminant spaces capture the color characteristics of images of nonhuman animal integument in ways that allow nonhuman animal integument pixels in an image to be segmented from other pixels in the image with relatively high accuracy.

Figure 4:
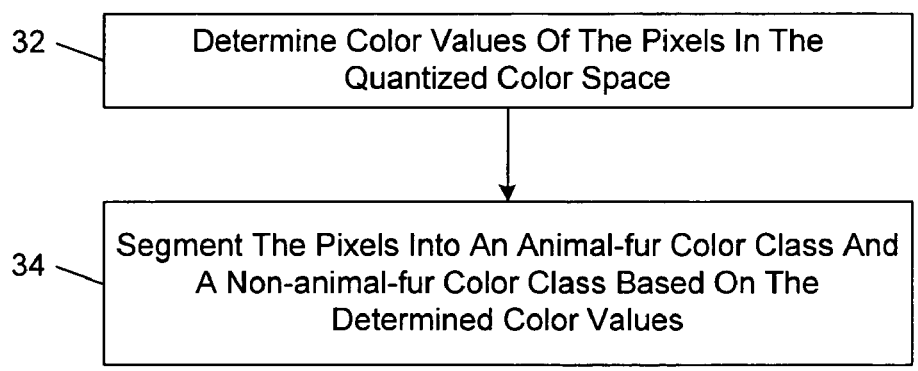
FIG. 4 is a flow diagram of an implementation of the image processing method of FIG. 2.

FIG. 4 shows an embodiment of a pixel classification method in accordance with which pixels of the input image 12 are classified into a nonhuman animal integument class based on features that span a quantized color discriminant space. In accordance with this embodiment, the feature value calculation module 16 determines color values of respective pixels of the input image 12 in the quantized color space (FIG. 4, block 32). The classification module 18 then segments the pixels into an animal-fur color class and a non-animal-fur color class based on the determined color values (FIG. 4, block 34).

It has been determined from an analysis of a sample of images of animals that animal-fur colors typically can be classified into a small class of possible animal fur colors. In this analysis, each image in the sample was cropped to remove non-fur-coated areas and the resulting cropped images were mapped to a quantized color space defined by a set of twenty-seven color names (or bins).

Figure 5:
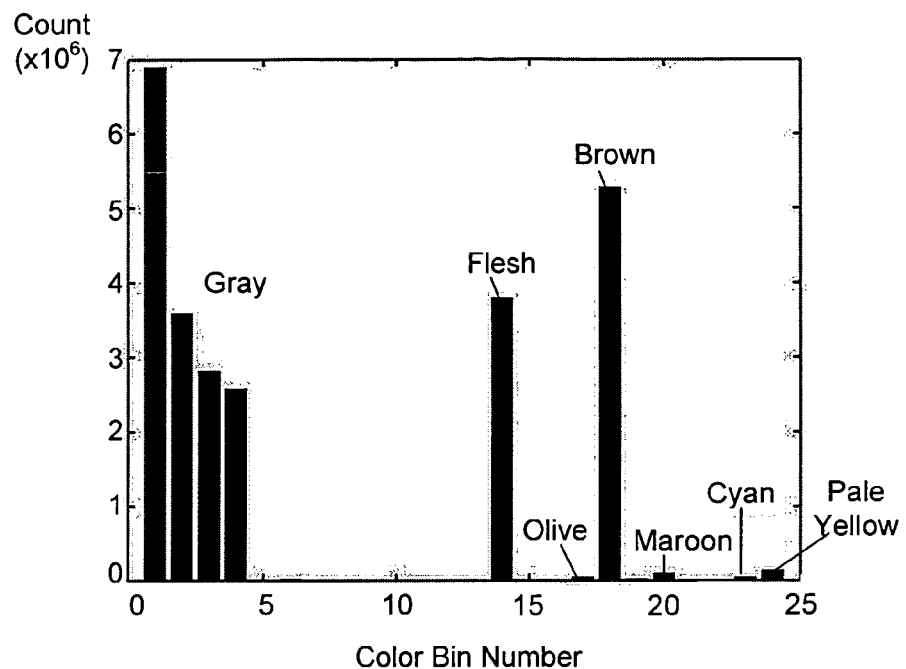
FIG. 5 is a histogram of animal fur colors that are obtained from a set of images and quantized into a set of predefined color ranges.

FIG. 5 shows a histogram of the number of pixels in a sample of sixty-two cropped images that were classified into respective ones of the twenty-seven color bins. As shown by the histogram, most of the animal-fur color images were classified into a small set of the possible color bins: brown, flesh, and five levels of gray, including white (which corresponds to bin number 0). Equations (6), (7), and (8) below provide an exemplary definition of these animal-fur colors in which the five levels of gray are defined in terms of a single luminance range. The remaining animal-fur colors (i.e., olive, maroon, cyan, and pale yellow) were determined to correspond to specular reflections from animal fur, reflections from other parts of the image (e.g., sky or grass) near the animals, and image artifacts or compression artifacts.

In some implementations of the pixel classification method of FIG. 4, the feature values of the pixels are used to generate a quantized color map of the input image 12. The quantized color map corresponds to a mapping of the input image 12 into the above-described quantized color space, which has a finite set of specified colors each of which is defined by a respective color range. The features correspond to color features (e.g., chroma and hue) that either are determined directly from the values of the pixels of the input image 12 or are derived from these pixel values.

The classification module 18 may apply one or more predicates that binarize the quantized color map to produce a classification map that labels pixels in the input image 12 as members of the target nonhuman animal integument class or as non-members of the target nonhuman animal integument class. In this process, pixels having color values corresponding to one of multiple specified gray levels, a specified brown color range, and a specified flesh color range are segmented into the target nonhuman animal integument class, whereas pixels having color values that do not correspond to one of the seven possible animal-fur color bins are segmented outside of the target nonhuman animal integument class.

In some embodiments, the classification module 18 produces the classification map directly from the input image in accordance with the process described in the following numbered paragraphs. In this process, the classification module 18 assigns to the animal-fur color class ones of the pixels of the input image 12 having: (i) a chroma value below a chroma threshold, as defined in equation (6); (ii) a chroma value below a chroma threshold, a luminance value below a luminance threshold, and a hue value outside a hue value range defined by a lower hue threshold and an upper hue threshold, as defined in equation (7); or (iii) a chroma value below a chroma threshold, a luminance value above a luminance threshold, and a hue value within a hue value range defined by a lower hue threshold and an upper hue threshold, as defined in equation (8).

1. Convert the input image 12 into the YCrCb color space. For example, in some embodiments, if the input image 12 originally is specified in the RGB color space, the input image pixels are mapped into the YCrCb color space as follows:

$$Y = 0.299 \cdot r + 0.587 \cdot g + 0.112 \cdot b \quad (1)$$

$$Cr = 0.713266 \cdot (r - Y) + 128 \quad (2)$$

$$Cb = 0.564334 \cdot (b - Y) + 128 \quad (3)$$

where r, g, and b are red, green, and blue component pixel values of input image 12, respectively, and Y, Cr, and Cb are the component pixel values in the YCrCb color space.

2. Calculate the chroma and hue for each of the input image pixels as follows:

$$\text{Chroma} = 1.88085 \cdot \sqrt{Cr \cdot Cb + Cb \cdot Cb} \quad (4)$$

$$\text{Hue} = 0.708333 \cdot \text{ArcTangent}\left(\frac{Cr}{Cb}\right) \quad (5)$$

3. Segment pixels of the input image 12 into the non-peteye class if one of the following conditions is true:
   a. the pixel is in a gray color range defined by:

$$\text{Chroma} < 25; \text{ or} \quad (6)$$

b. the pixel is in a brown color range defined by:

$$(\text{Chroma} < 120) \text{ AND } (Y < 120) \text{ AND } (\text{Hue} \geq 254 \text{ OR Hue} \leq 45); \text{ or} \quad (7)$$

c. the pixel is in a flesh color range defined by:

$$(\text{Chroma} < 115) \text{ AND } (Y \geq 120) \text{ AND } (10 \leq \text{Hue} \leq 45). \quad (8)$$

Figure 6A:
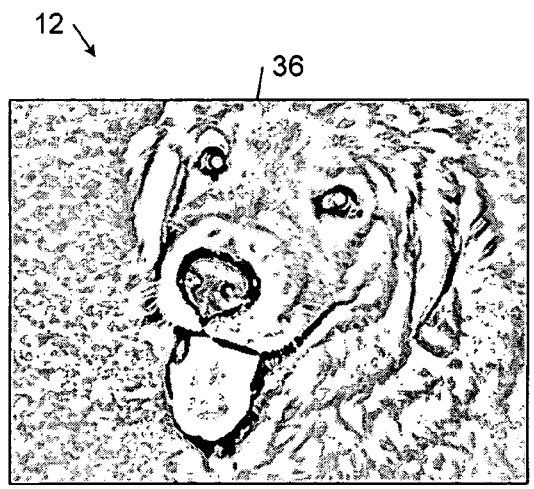
FIG. 6A is an exemplary image of a dog.

FIG. 6A shows an exemplary input image 36 that contains a depiction of a dog.

Figure 6B:
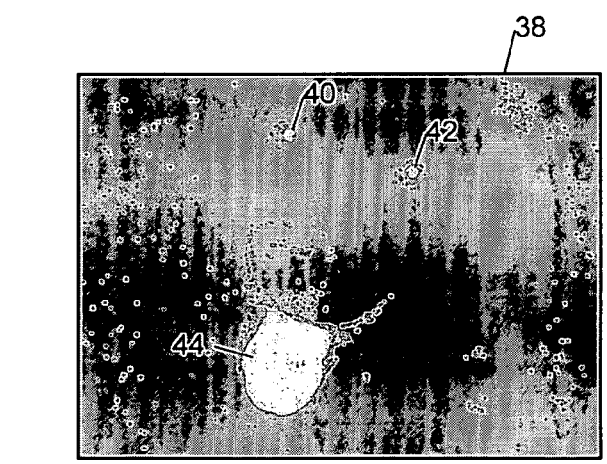
FIG. 6B is an image of a classification map that is derived by segmenting pixels in the image of FIG. 6A into an animal-fur color class and a non-animal-fur color class.

FIG. 6B shows a classification map 38 that is derived by segmenting pixels in the input image 36 into an animal-fur color class (shown by the gray pixels) and a non-animal-fur color class (shown by the white pixels). As shown in the classification map 38, although the background pixels in the exemplary image 36 have been classified as animal fur, there is high contrast between the white pixels (which correspond to the non-animal-fur-color peteyes 40, 42 and the dog's tongue 44) and the surrounding gray pixels (which correspond to animal-fur color pixels). In some embodiments, the classification module 18 may use the classification map 38 to detect the peteyes 40, 42 in the input image 36. Alternatively, the classification module 18 may use the classification map 38 together with one or more additional features that capture the presence of one or more of the peteyes and/or the dog's tongue to verify that an animal is indeed depicted in the input image 36.

IV. TEXTURE DISCRIMINANT SPACES FOR CLASSIFYING PIXELS OF THE INPUT IMAGE

Certain texture discriminant spaces capture the texture characteristics of images of nonhuman animal integument in ways that allow nonhuman animal integument pixels in an image to be segmented from other pixels in the image with relatively high accuracy. In particular, it has been determined that texture discriminant spaces defined by one or more texture metric features that are derived from coefficients of directional multiresolution transformations can be used to segment nonhuman animal integument pixels from other pixels in an image.

Figure 7:
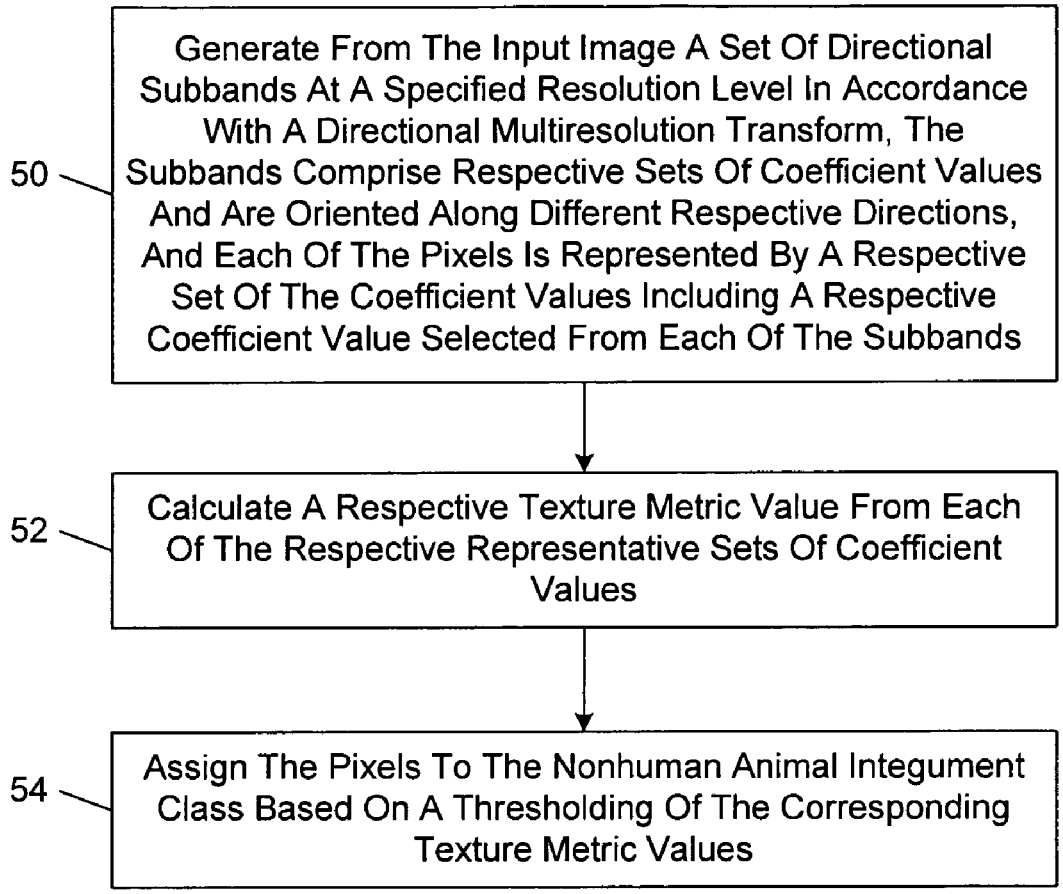
FIG. 7 is a flow diagram of an implementation of the image processing method of FIG. 2.

FIG. 7 shows an embodiment of a pixel classification method in accordance with which pixels of the input image 12 are classified into a nonhuman animal integument class based on a feature that spans a texture metric discriminant space. In accordance with this embodiment, the feature value calculation module 16 generates from the input image 12 a set of directional subbands (or subband images) at a specified resolution level in accordance with a directional multiresolution transform (FIG. 7, block 50). The feature value calculation module 16 calculates a respective texture metric value from each of the representative sets of coefficient values (FIG. 7, block 52). The classification module 18 then assigns the pixels to the nonhuman animal integument class based on a thresholding of the corresponding texture metric values (FIG. 7, block 54).

In some embodiments, before the directional subbands and the texture metric values are computed, the input image 12 initially is normalized in accordance with the following process:

1. Convert the input image 12 into a grayscale color space. For example, in some embodiments, if the input image 12 originally is specified in the RGB color space, the input image pixels are mapped in accordance with a grayscale mapping G, which is given by:

$$G = 0.299 \times r + 0.587 \times g + 0.114 \times b \quad (9)$$

where r, g, and b are red, green, and blue component pixel values of input image 12.

2. Optionally, down-sample the resulting grayscale image to a specified size. For example, in some embodiments, the grayscale image is down-sampled to approximate a standard image size (e.g., four inches high by six inches wide) and a standard viewing distance (e.g., eighteen inches).

After the input image 12 has been normalized, the feature value calculation module 16 calculates one or more resolution levels of a directional multiresolution transform. In general, the feature value calculation module 16 may generate the directional subbands in accordance with any spectral transformation that provides multiresolution (or multiscale) and directional image representations, including the contourlet transform, two-dimensional Gabor wavelets, the context transform, the steerable pyramid, two-dimensional directional wavelets, brushlets, and complex wavelets.

In the exemplary embodiments that are described in detail below, the feature value calculation module 16 generates the directional subbands in accordance with the contourlet transform, which includes a double filter bank structure that uses the Laplacian pyramid to capture point discontinuities followed by a directional filter bank that links point discontinuities into linear structures. The contourlet transform generates a directional multiresolution expansion of the input image 12. Additional details regarding the structure and operation of the contourlet transform may be obtained from, for example, M. Do and M. Vetterli, "The Contourlet Transform: An Efficient Directional Multiresolution Image Representation," IEEE Transactions on Image Processing, Vol. 14, No. 12 (December 2005).

Figure 8:
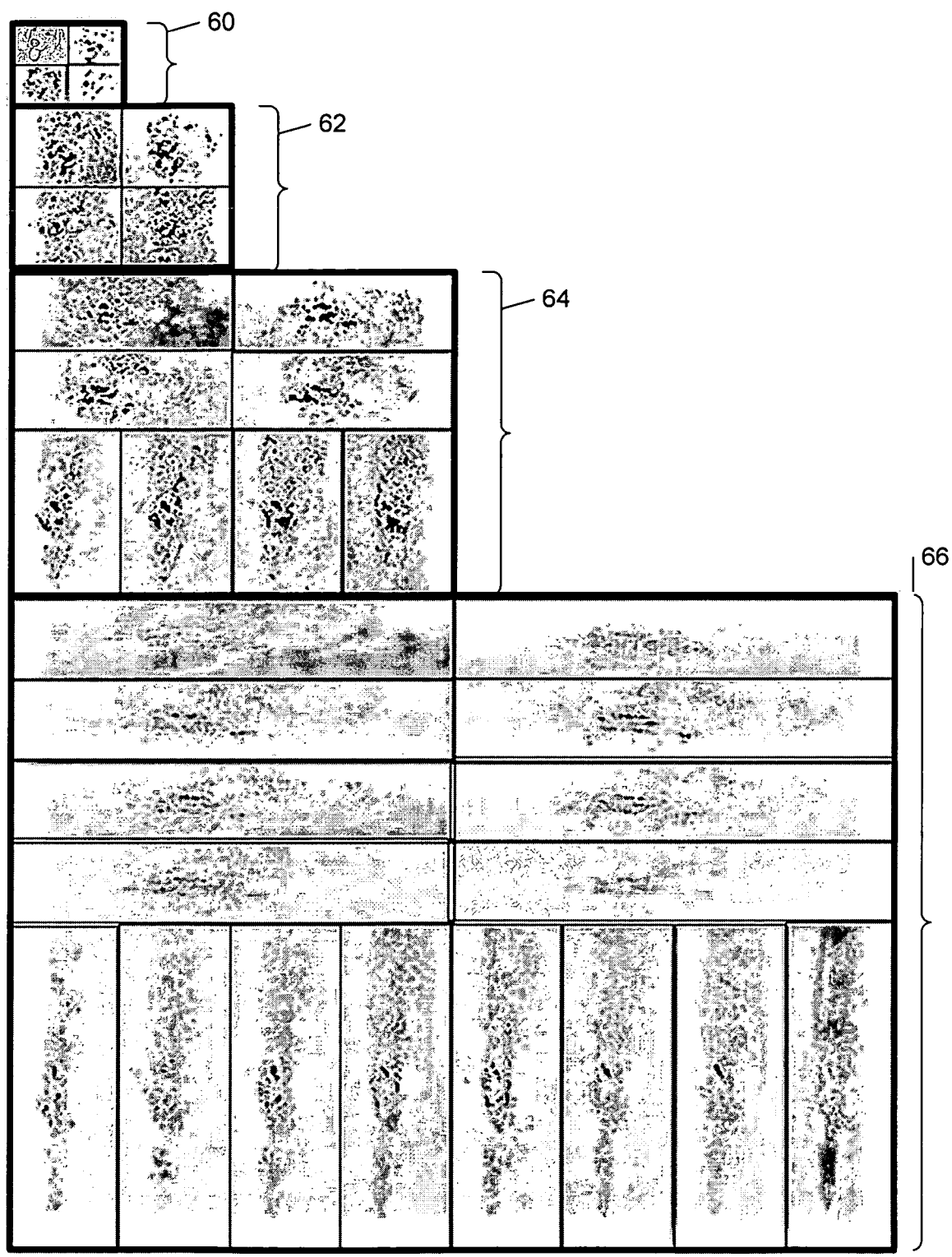
FIG. 8 is a diagrammatic view of an expansion of an image into respective sets of subbands at multiple resolution levels in accordance with a contourlet transform.

FIG. 8 shows a contourlet transform expansion of the exemplary input image 36 that is shown in FIG. 6A. The expansion includes four resolution (or pyramid) levels 60, 62, 64, 66. At each resolution level of the expansion, the input image 36 is represented by a respective set of directional subbands, each of which is oriented along a different respective direction and includes a respective set of coefficient values. In FIG. 8, small coefficient values are colored light and large coefficient values are colored dark. In the exemplary expansion shown in FIG. 8, the first resolution level 60 has an angular resolution of zero and corresponds to a standard wavelet transformation. The second resolution level 62 is decomposed into four subbands that provide an angular resolution of four. The third resolution level 64 is decomposed into eight subbands that provide an angular resolution of eight. The fourth resolution level 66 is decomposed into sixteen subbands that provide an angular resolution of sixteen.

At each resolution level of the expansion, each pixel of the image 36 is represented by a respective coefficient value of each of the subbands of the level. Thus, for a given resolution level l, each pixel k of the image 36 is represented by a respective set of the subband coefficient values that includes a respective coefficient value $d_{kli}$ from each of the subbands i. That is, in given resolution level l each pixel k may be represented by a vector $\vec{d}_{kl}$, which is defined by $$\vec{d}_{kl} = \{d_{kl1}, d_{kl2}, \ldots, d_{klN}\} \quad (10)$$

where $N_l$ is the number of subbands in resolution level l. Therefore, each pixel of the image 36 is represented by four coefficient values in the first and second resolution levels, eight coefficient values in the third resolution level, and sixteen coefficient values in the fourth resolution level.

In some embodiments, the input image 12 computed contourlet transform coefficients are normalized in accordance with the following process:

1. Take the absolute value of the floating-point transform coefficients.

2. For each resolution level, determine the maximum absolute coefficient value across all the subbands.

3. For each resolution level, normalize the coefficient values across all the subbands by the smallest power of 2 larger than the determined maximum absolute coefficient value.

4. For each resolution level, optionally map the normalized coefficient values across all the subbands from [0.0, 1.0] to [0, 255].

5. For each resolution level, optionally scale each of the subbands to the original size of the input image.

After the transform coefficients have been normalized, the feature value calculation module 16 calculates for each pixel k of the input image 36 a respective texture metric value from each of the representative sets of coefficient values $\{d_{kli}\}$ at each given resolution level l. In some embodiments, the texture metric values correspond to vector norm values computed from the sets of coefficient values. In these embodiments, the feature value calculation module 16 calculates from each of the representative sets of coefficient values of a respective vector norm $|\vec{d}_{kl}|_P$, which is given by the general expression:

$$|\vec{d}_{kl}|_P = \left(\sum_i |d_{kli}|^P\right)^{\frac{1}{P}} \quad (11)$$

where P corresponds to a positive integer that specifies the type of vector norm. The vector norm for P=1 typically is referred to as the P1-norm, the vector norm for P=2 typically is referred to as the P2-norm, and P=∞ typically is referred to the infinity norm, which is equal to the maximum coefficient value. In some of these embodiments, the computed vector norm values are used as the texture metric values.

In some other embodiments, the texture metric values are derived from the computed vector norm values. For example, in some of these embodiments, the average vector norm values $|\overline{D}_{kl}|_P$ defined in equation (12) are used as the texture metric values:

$$|\overline{D}_{kl}|_P = \frac{1}{N_l} \cdot \left(\sum_i |d_{kli}|^P\right)^{\frac{1}{P}} \quad (12)$$

where $N_l$ is the number of subbands in resolution level l.

In some embodiments, the classification module 18 classifies pixels of the input image 36 into the nonhuman animal integument class based on a respective thresholding of the corresponding texture metric values at each of one or more of the resolution levels of the expansion of the input image 36. If a pixel satisfies the prescribed thresholding bounds, the pixel is classified as a nonhuman animal integument pixel; otherwise, the pixel is rejected from the nonhuman animal integument class.

In some of these embodiments, the classification module 18 compares the calculated texture metric values to a target range of texture metric values that is defined by an upper texture metric threshold and a lower texture metric threshold. The classification module 18 assigns ones of the pixels of the input image 36 having respective texture metric values within the target range to the nonhuman animal integument class. Thus, with respect to the embodiments in which the computed vector norm values are used as the texture metric values:

$$d_{MIN,l} \leq |\vec{d}_{kl}|_P \leq d_{MAX,l} \text{ assign pixel } k \text{ to nonhuman animal integument class} \quad (13)$$

$$|\vec{d}_{kl}|_P < d_{MIN,l} \text{ or reject pixel } k \text{ from nonhuman animal integument class}$$

$$|\vec{d}_{kl}|_P > d_{MAX,l} \quad (14)$$

where $d_{MIN,l}$ is the lower texture metric threshold at resolution level l, and $d_{MAX,l}$ is the upper texture metric threshold at resolution level l. With respect to the embodiments in which the computed vector norm values are used as the texture metric values:

$$D_{MIN,l} \leq |\overline{D}_{kl}|_P \leq D_{MAX,l} \text{ assign pixel } k \text{ to nonhuman animal integument class} \quad (15)$$

$$|\overline{D}_{kl}|_P < D_{MIN,l} \text{ or reject pixel } k \text{ from nonhuman animal integument class}$$

$$|\overline{D}_{kl}|_P > D_{MAX,l} \quad (16)$$

where $D_{MIN,l}$ is the lower texture metric threshold at resolution level l, and $D_{MAX,l}$ is the upper texture metric threshold at resolution level l.

In general, the classification module 18 may classify pixels of the input image 36 using one or more of the texture metric values that are calculated for each pixel at each of one or more of the respective resolution levels. In some cases, the classification results are improved, however, by limiting the classification to the one resolution level that provides the highest segmentation accuracy with respect to a sample of pre-labeled images exhibiting the target nonhuman animal integument characteristics (e.g., hair, fur, features, or reptilian skin).

The resulting classification of the input image pixels may be represented by a binary classification map in which pixels that are accepted into the nonhuman animal integument class are colored one color (e.g., white) and pixels that are rejected from the nonhuman animal integument class are colored a different color (e.g., black). In some embodiments, the classification module 18 may apply one or more morphological operations to the binary classification map to smooth the boundaries between the different pixel regions. For example, in some exemplary implementations, the morphological operations of dilation followed by erosion may be applied to the pixels that are rejected from the nonhuman animal integument class in order to smooth the boundaries of these pixel regions.

Figure 9A:
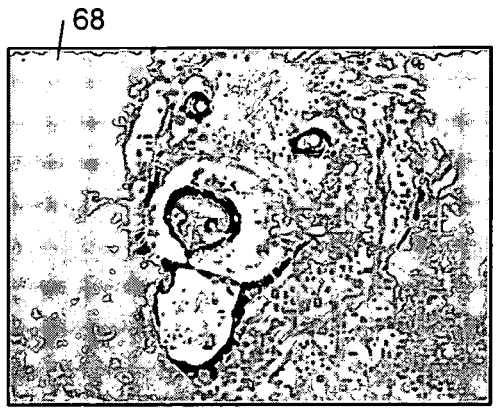
FIG. 9A is a diagrammatic view of the image of FIG. 6A with an overlying binary classification map generated by marking with gray (low) values pixels having texture metric values above a lower texture metric threshold.
Figure 9B:
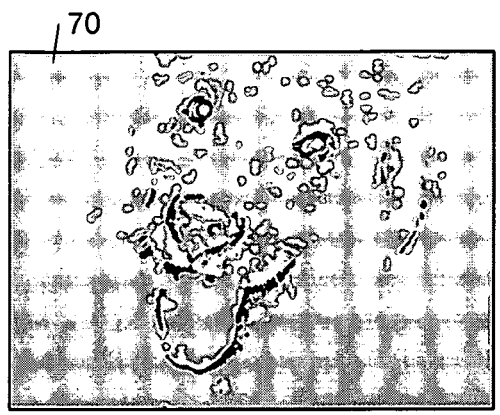
FIG. 9B is a diagrammatic view of the image of FIG. 6A with an overlying binary classification map generated by marking with gray (low) values pixels having texture metric values below an upper texture metric threshold.
Figure 9C:
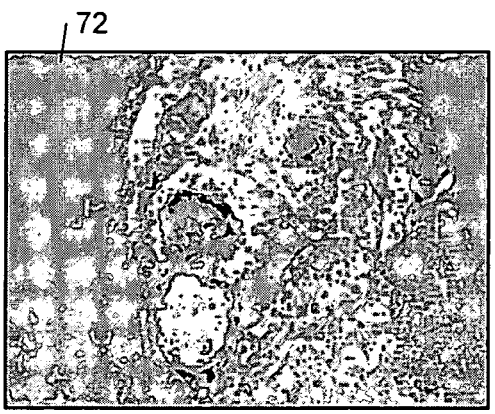
FIG. 9C is a diagrammatic view of the image of FIG. 6A with an overlying binary classification map generated by subtracting the binary classification map shown in FIG. 9B from the binary classification map shown in FIG. 9A.
Figure 9D:
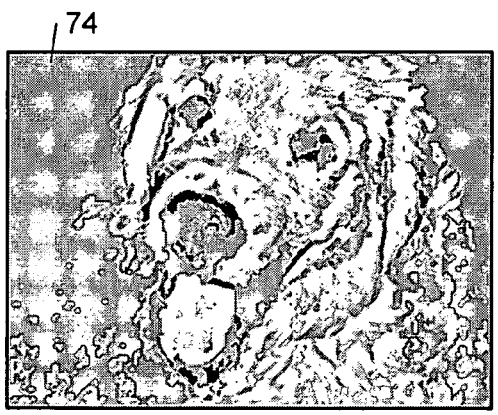
FIG. 9D is a diagrammatic view of the image of FIG. 6A with an overlying binary classification map generated by applying morphological operations to the binary classification map shown in FIG. 9C.

FIGS. 9A-9D show the results at various stages during application of an exemplary implementation of the embodiment defined by equations (14) and (15) to the exemplary input image 36 shown in FIG. 6A. FIG. 9A shows the input image 36 with an overlying binary classification map 68 (shown by grays values). The classification module 18 generates the binary classification map 68 by marking with gray (low) values pixels of the input image 36 having texture metric values in the third resolution level 64 (i.e., l=3) that are above a lower texture metric threshold (i.e., $D_{MIN,3}$) FIG. 9B shows the input image 36 with an overlying binary classification map 70 that is generated by marking with gray (low) values pixels of the input image 36 having texture metric values in the third resolution level 64 that are below an upper texture metric threshold (i.e., $D_{MAX,3}$). FIG. 9C shows the input image 36 with an overlying binary classification map 72 that is generated by subtracting the binary classification map 70 from the binary classification map 68. FIG. 9D shows the image 36 with an overlying binary classification map 74 that is generated by applying morphological operations to the binary classification map 72.

V. CONCLUSION

The embodiments that are described in detail herein provide systems and methods that are capable of classifying pixels of nonhuman animals in an image based on the values of features that are determined for the pixels of the image. The features are designed to capture one or more characteristics of image content depicting nonhuman animal integument (i.e., the outer protective covering, such as fur, hair, or skin, of a nonhuman animal). The embodiments specifically are designed to segment feature values representing pixels that are associated with a nonhuman animal integument characteristic from feature values representing pixels that are not associated with the nonhuman animal integument characteristic. Consequently, these embodiments are expected to more accurately detect image content corresponding to nonhuman animal integument and thereby provide improved automatic categorization and indexing of images of nonhuman animals.

Other embodiments are within the scope of the claims.

What is claimed is:

1. A method of processing an input image, comprising:
a computer determining from pixels of the input image values of multiple color features spanning a color discriminant space and determining from coefficients of a directional multiresolution transformation of the input image values of multiple texture features spanning a texture discriminant space; and
the computer classifying the pixels into a nonhuman animal integument class based on the determined feature values and mappings that respectively segment the color discriminant space and the texture discriminant space into one or more regions of feature values representing pixels associated with a nonhuman animal integument characteristic and one or more regions of feature values representing pixels unassociated with the nonhuman animal integument characteristic.

2. A method of processing an input image, comprising:
a computer determining values of features in a discriminant space for respective pixels of the input image, wherein the determining comprises determining color values of the pixels; and
the computer classifying the pixels into a nonhuman animal integument class based on the respective feature values and a mapping that segments the discriminant space into one or more regions of feature values representing pixels associated with a nonhuman animal integument characteristic and one or more regions of feature values representing pixels unassociated with the nonhuman animal integument characteristic, wherein the assigning comprises segmenting the pixels into an animal-fur color class and a non-animal-fur color class based on the determined color values.

3. The method of claim 2, wherein the assigning comprises assigning to the animal-fur color class ones of the pixels having a chroma value below a chroma threshold.

4. The method of claim 2, wherein the assigning comprises assigning to the animal-fur color class ones of the pixels having a chroma value below a chroma threshold, a luminance value below a luminance threshold, and a hue value outside a hue value range defined by a lower hue threshold and an upper hue threshold.

5. The method of claim 2, wherein the assigning comprises assigning to the animal-fur color class ones of the pixels having a chroma value below a chroma threshold, a luminance value above a luminance threshold, and a hue value within a hue value range defined by a lower hue threshold and an upper hue threshold.

6. The method of claim 1, wherein the determining comprises generating from the input image a set of directional subbands at a specified resolution level in accordance with a directional multiresolution transform, the subbands comprise respective sets of coefficient values and are oriented along different respective directions, and each of the pixels is represented by a respective set of the coefficient values comprising a respective coefficient value selected from each of the subbands.

7. The method of claim 6, wherein the determining additionally comprises calculating a respective texture metric value from each of the representative sets of coefficient values.

8. The method of claim 7, wherein the calculating comprises calculating a respective LP-norm value from each of the representative sets of coefficient values.

9. The method of claim 7, wherein the assigning comprises assigning the pixels to the nonhuman animal integument class based on a thresholding of the corresponding texture metric values.

10. The method of claim 9, wherein the thresholding comprises comparing the calculated texture metric values to a target range of texture metric values, the target range being defined by an upper texture metric threshold and a lower texture metric threshold, and the assigning comprises assigning to the nonhuman animal integument class ones of the pixels having respective texture metric values within the target range.

11. The method of claim 6, wherein the generating comprises generating the set of directional subbands at the specified resolution level from the input image in accordance with a contourlet transform.

12. Apparatus, comprising:
a computer-readable medium storing computer-readable instructions; and
a data processor coupled to the computer-readable medium, operable to execute the instructions, and based at least in part on the execution of the instructions operable to perform operations comprising
determining from pixels of the input image values of multiple color features spanning a color discriminant space and determining from coefficients of a directional multiresolution transformation of the input image values of multiple texture features spanning a texture discriminant space; and
classifying the pixels into a nonhuman animal integument class based on the determined feature values and mappings that respectively segment the color discriminant space and the texture discriminant space into one or more regions of feature values representing pixels associated with a nonhuman animal integument characteristic and one or more regions of feature values representing pixels unassociated with the nonhuman animal integument characteristic.

13. The system of claim 12, wherein feature value calculation module operable to determine color values of the pixels and the classification module is operable to segment the pixels into an animal-fur color class and a non-animal-fur color class based on the determined color values.

14. The system of claim 13, wherein the classification module is operable to assign to the animal-fur color class ones of the pixels having a chroma value below a chroma threshold, a luminance value below a luminance threshold, and a hue value outside a hue value range defined by a lower hue threshold and an upper hue threshold.

15. The system of claim 13, wherein the classification module is operable to assign to the animal-fur color class ones of the pixels having a chroma value below a chroma threshold, a luminance value above a luminance threshold, and a hue value within a hue value range defined by a lower hue threshold and an upper hue threshold.

16. The system of claim 12, wherein the feature value calculation module operable to generate from the input image a set of directional subbands at a specified resolution level in accordance with a directional multiresolution transform, the subbands comprise respective sets of coefficient values and are oriented along different respective directions, and each of the pixels is represented by a respective set of the coefficient values comprising a respective coefficient value selected from each of the subbands.

17. The system of claim 16, wherein the feature value calculation module operable to calculate a respective texture metric value from each of the representative sets of coefficient values.

18. The system of claim 17, wherein the feature value calculation module operable to calculate a respective LP-norm value from each of the representative sets of coefficient values.

19. The system of claim 18, wherein the classification module is operable to assign the pixels to the nonhuman animal integument class based on a thresholding of the corresponding texture metric values.

20. A non-transitory computer-readable medium storing program instructions that, when executed by processing circuitry, cause the processing circuitry to perform operations comprising:
determining from pixels of the input image values of multiple color features spanning a color discriminant space and determining from coefficients of a directional multiresolution transformation of the input image values of multiple texture features spanning a texture discriminant space; and
classifying the pixels into a nonhuman animal integument class based on the determined feature values and mappings that respectively segment the color discriminant space and the texture discriminant space into one or more regions of feature values representing pixels associated with a nonhuman animal integument characteristic and one or more regions of feature values representing pixels unassociated with the nonhuman animal integument characteristic.

* * * * *

UNITED STATES PATENT AND TRADEMARK OFFICE
CERTIFICATE OF CORRECTION

PATENT NO. : 8,064,694 B2  Page 1 of 1
APPLICATION NO. : 11/472712
DATED : November 22, 2011
INVENTOR(S) : Jonathan Yen et al.

It is certified that error appears in the above-identified patent and that said Letters Patent is hereby corrected as shown below:

In column 11, line 30, in Claim 8, delete "LP-norm" and insert -- $L^P$-norm --, therefor.

In column 12, line 37-38, in Claim 18, delete "LP-norm" and insert -- $L^P$-norm --, therefor.

Signed and Sealed this
Eleventh Day of September, 2012

David J. Kappos
*Director of the United States Patent and Trademark Office*